(12) United States Patent
Noh et al.

(10) Patent No.: US 11,900,607 B2
(45) Date of Patent: Feb. 13, 2024

(54) METHOD AND APPARATUS FOR FRAMING THREE DIMENSIONAL TARGET OBJECT FOR GENERATION OF VIRTUAL CAMERA LAYOUT

(71) Applicant: KOREA ADVANCED INSTITUTE OF SCIENCE AND TECHNOLOGY, Daejeon (KR)

(72) Inventors: Junyong Noh, Daejeon (KR); Jung Eun Yoo, Daejeon (KR); Kwanggyoon Seo, Daejeon (KR); Sanghun Park, Daejeon (KR); Jaedong Kim, Daejeon (KR); Dawon Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 106 days.

(21) Appl. No.: 17/743,448

(22) Filed: May 13, 2022

(65) Prior Publication Data

US 2023/0177693 A1 Jun. 8, 2023

(30) Foreign Application Priority Data

Dec. 3, 2021 (KR) .................. 10-2021-0172294

(51) Int. Cl.
*G06T 7/11* (2017.01)
*G06T 7/62* (2017.01)
*G06T 15/20* (2011.01)

(52) U.S. Cl.
CPC .............. *G06T 7/11* (2017.01); *G06T 7/62* (2017.01); *G06T 15/205* (2013.01)

(58) Field of Classification Search
CPC ............ G06T 7/11; G06T 7/62; G06T 15/205
See application file for complete search history.

(56) References Cited

U.S. PATENT DOCUMENTS

| 2018/0184072 | A1* | 6/2018 | Yoshimura | ............ G06T 19/003 |
| 2020/0013220 | A1* | 1/2020 | Yoshimura | ............ G06T 15/205 |

FOREIGN PATENT DOCUMENTS

| KR | 10-2020-0044714 A | 4/2020 |
| KR | 20200047267 A * | 5/2020 |
| KR | 10-2021-0074747 A | 6/2021 |
| KR | 10-2316111 B1 | 10/2021 |
| KR | 10-2316114 B1 | 10/2021 |

OTHER PUBLICATIONS

Yoo et al., Virtual Camera Layout Generation using a Reference Video, May 7, 2021, ACM, CHI '21: Proceedings of the 2021 CHI Conference on Human Factors in Computing Systems, pp. 1-11. (Year: 2021).*

* cited by examiner

*Primary Examiner* — Jeffery A Brier
(74) *Attorney, Agent, or Firm* — CANTOR COLBURN LLP (57) ABSTRACT

Provided is a method of framing a three dimensional (3D) target object for generation of a virtual camera layout. The method may include analyzing a reference video image to extract a framing rule for at least one reference object in the reference video image, generating a framing rule for at least one 3D target object using the framing rule for the at least one reference object in the reference video image, and using the framing rule for the at least one 3D target object for generation of a virtual camera layout.

13 Claims, 4 Drawing Sheets

METHOD AND APPARATUS FOR FRAMING THREE DIMENSIONAL TARGET OBJECT FOR GENERATION OF VIRTUAL CAMERA LAYOUT

CROSS-REFERENCE TO RELATED APPLICATION

This application claims the benefit of Korean Patent Application No. 10-2021-0172294 filed on Dec. 3, 2021, in the Korean Intellectual Property Office, the entire disclosure of which is incorporated herein by reference for all purposes.

BACKGROUND

1. Field of the Invention

One or more example embodiments relate to a computer animation technology.

2. Description of the Related Art

A camera layout is a key element in cinematography for conveying an emotional aspect and suspense of a movie scene. A movie director creates a guideline known as a "shot list" to communicate with three dimensional (3D) animation layout artists. The layout artists arrange, based on the shot list, a virtual camera to better reflect the movie director's shooting intention. However, for most novice artists, it is not easy to accurately express the movie direction's intention through the virtual camera, due to a high degree of freedom. Even professional artists spend a lot of time iteratively arranging numerous virtual cameras required for a TV series production process. Accordingly, there is a need for a technology for automatically generating a virtual camera layout by analyzing a camera layout of a reference video.

SUMMARY

Example embodiments provide a technology for generating a virtual camera layout for a three dimensional (3D) animation that simulates a shooting intention of a reference video in a monkey-see-monkey-do fashion.

A technical issue to be resolved by example embodiments is not limited to the above-described technical issue, and other technical issues not mentioned will be clearly understood by those skilled in the art from the description below.

According to an aspect, there is provided a method of framing a 3D target object for generation of a virtual camera layout, the method including analyzing a reference video image to extract a framing rule for at least one reference object in the reference video image, generating a framing rule for at least one 3D target object using the framing rule for the at least one reference object in the reference video image, and using the framing rule for the at least one 3D target object for generation of a virtual camera layout.

In an example embodiment, the analyzing a reference video image to extract a framing rule for at least one reference object in the reference video image may include identifying a framing type of the reference video image by analyzing the reference video image, and calculating first on-screen parameters for the at least one reference object by analyzing the reference video image.

In an example embodiment, the generating a framing rule for at least one 3D target object using the framing rule for the at least one reference object in the reference video image may include optimizing at least one second on-screen parameter for the at least one 3D target object, based on the first on-screen parameters.

In an example embodiment, the identifying a framing type of the reference video image by analyzing the reference video image may include classifying the reference video image into one of a close-up (CU) framing type, a medium close-up (MCU) framing type, a medium shot (MS) framing type, a medium long shot (MLS) framing type, a full shot (FS) framing type, and a long shot (LS) framing type.

In an example embodiment, the at least one reference object may include a first reference object and a second reference object. The calculating first on-screen parameters for the at least one reference object by analyzing the reference video image may include calculating coordinates of face central points of the first and second reference objects, height values up to tops of heads of the first and second reference objects, and headroom values for the first and second reference objects by applying a predetermined image processing technique to the reference video image.

In an example embodiment, the at least one 3D target object may include a first target object and a second target object. The optimizing at least one second on-screen parameter for the at least one 3D target object based on the first on-screen parameters may include calculating coordinates $p_A(u_A, v_A)$ of a face central point of the first target object and coordinates $p_B(u_B, v_B)$ of a face central point of the second target object so as to minimize a value expressed by the equation below:

$$\omega_1 E_V + \omega_2 E_H + \omega_3 E_M$$

where $\omega_1$ represents a weight for $E_V$, $\omega_2$ represents a weight for $E_H$, $\omega_3$ represents a weight for $E_M$, and a sum of $\omega_1$, $\omega_2$, and $\omega_3$ is 1. $E_V$ may be represented by the equation below:

$$E_V = |s_A - s_{A'}| + |s_B - s_{B'}|$$

where $s_A$ and $s_B$ denote height values up to tops of heads of the first and second target objects, respectively, and $s_{A'}$ and $s_{B'}$ denote height values up to the tops of the heads of the first and second reference objects, respectively. $E_H$ may be expressed by the equation below:

$$E_H = |\min(h_A, h_B) - \min(h_{A'}, h_{B'})|$$

where $h_A$ and $h_B$ denote headroom values for the first and second target objects, respectively, and $h_{A'}$ and $h_{B'}$ denote the headroom values for the first and second reference objects, respectively. $E_M$ may be expressed by the equation below:

$$E_M = |(u_A + u_B)/2 - (u_{A'} + u_{B'})/2|$$

where $u_A$ and $u_B$ denote X coordinates of the face central points of the first and second target objects, respectively, and $u_{A'}$ and $u_{B'}$ denote X coordinates of the face central points of the first and second reference objects, respectively.

According to another aspect, there is provided an apparatus for framing a 3D target object for generation of a virtual camera layout, the apparatus including a database to store a reference video image, and an image processor. The image processor may be configured to analyze a reference video image to extract a framing rule for at least one reference object in the reference video image, generate a framing rule for at least one 3D target object using the framing rule for the at least one reference object in the reference video image, and generate a virtual camera layout using the framing rule for the at least one 3D target object.

In an example embodiment, the image processor may be further configured to identify a framing type of the reference video image by analyzing the reference video image, and calculate first on-screen parameters for the at least one reference object by analyzing the reference video image.

In an example embodiment, the image processor may be further configured to optimize at least one second on-screen parameter for the at least one 3D target object, based on the first on-screen parameters.

In an example embodiment, the image processor may be further configured to classify the reference video image into one of a CU framing type, an MCU framing type, an MS framing type, an MLS framing type, an FS framing type, and an LS framing type.

In an example embodiment, the at least one reference object may include first and second reference objects. The image processor may be further configured to calculate coordinates of face central points of the first and second reference objects, height values up to tops of heads of the first and second reference objects, and headroom values for the first and second reference objects by applying a predetermined image processing technique to the reference video image.

In an example embodiment, the at least one 3D target object may include a first target object and a second target object. The image processor may be further configured to calculate coordinates $p_A(u_A, v_A)$ of a face central point of the first target object and coordinates $p_B(u_B, v_B)$ of a face central point of the second target object so as to minimize a value expressed by the equation below:

$$\omega_1 E_V + \omega_2 E_H + \omega_3 E_M$$

where $\omega_1$ represents a weight for $E_V$, $\omega_2$ represents a weight for $E_H$, $\omega_3$ represents a weight for $E_M$, and a sum of $\omega_1$, $\omega_2$, and $\omega_3$ is 1. $E_V$ may be expressed by the equation below:

$$E_V = |s_A - s_{A'}| + |s_B - s_{B'}|$$

where $s_A$ and $s_B$ denote height values up to tops of heads of the first and second target objects, respectively, and $s_{A'}$ and $s_{B'}$ denote height values up to the tops of the heads of the first and second reference objects, respectively. $E_H$ may be expressed by the equation below:

$$E_H = |\min(h_A, h_{B'}) - \min(h_A, h_B)|$$

where $h_A$ and $h_B$ denote headroom values for the first and second target objects, respectively, and $h_{A'}$ and $h_{B'}$ denote the headroom values for the first and second reference objects, respectively. $E_M$ may be expressed by the equation below:

$$E_M = |(u_A + u_B)/2 - (u_{A'} + u_{B'})/2|$$

where $u_A$ and $u_B$ denote X coordinates of the face central points of the first and second target objects, respectively, and $u_{A'}$ and $u_{B'}$ denote X coordinates of the face central points of the first and second reference objects, respectively.

Additional aspects of example embodiments will be set forth in part in the description which follows and, in part, will be apparent from the description, or may be learned by practice of the disclosure.

According to example embodiments, there is a technical effect of generating a virtual camera layout for a 3D animation that simulates a shooting intention of a reference video in a monkey-see-monkey-do fashion.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements in the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component in the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
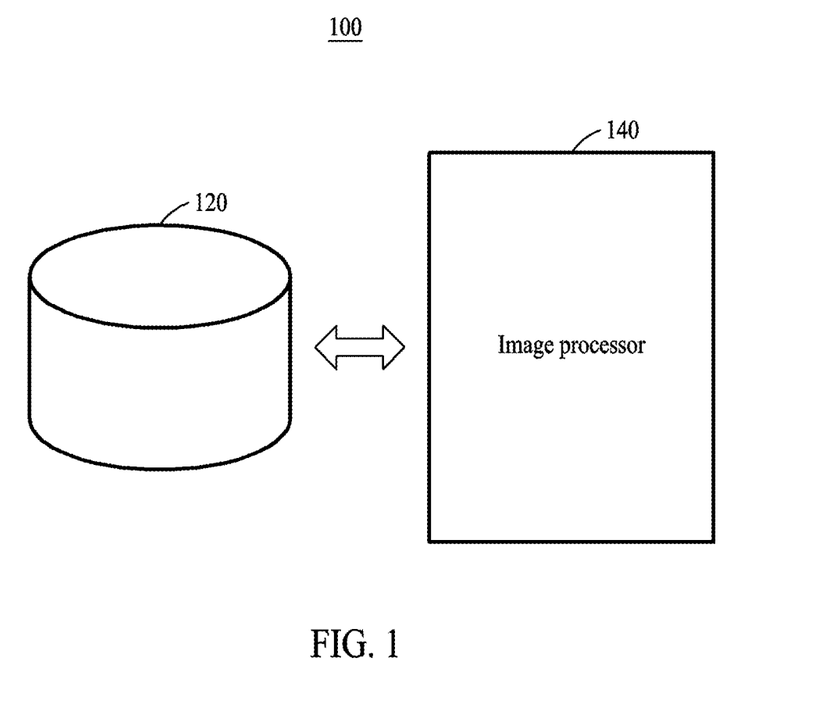
FIG. 1 is a block diagram illustrating an apparatus for framing a three dimensional (3D) target object to generate a virtual camera layout according to an example embodiment.

FIG. 1 is a block diagram illustrating an apparatus for framing a three dimensional (3D) target object to generate a virtual camera layout according to an example embodiment.

As illustrated in FIG. 1, a 3D target object framing apparatus 100 may include a database 120, and an image processor 140 communicatively coupled to the database 120. The database 120 may store at least one reference video. The reference video may include a plurality of video image frames. An image frame of the reference video may be an image frame including a reference object that serves as a reference for application to a 3D target object, which is a character appearing in a 3D animation to be produced. The reference video may be various genres of movie frames in which real actors appear, but it should be understood to that a type of the reference video is not limited thereto. In an example embodiment, the image frame of the reference video may be an image frame in which a specific actor appears. In this example embodiment, the specific actor may be a reference object, and a layout of a camera that shoots the reference object may be simulated in a monkey-see-monkey-do fashion to generate a virtual camera layout for the 3D target object. The database 120 may be used to store image data of an intermediate result obtained by performing image processing according to various example embodiments, image data of a result obtained by performing image processing according to various example embodiments, and variable values required to perform image processing according to various example embodiments. In various example embodiments, the database 120 may store the above-described various images in a general image file format (BMP, JPEG, TIFF, or the like). The database 120 may further store software/firmware and the like required to implement the image processor 140. The database 120 may be implemented as one of storage media such as a flash memory type, a hard disk type, a multimedia card (MMC), a card type memory (for example, a secure digital (SD) card, eXtream digital (XD) card, or the like), random access memory (RAM), static random access memory (SRAM), read-only memory (ROM), electrically erasable programmable read-only memory (EEPROM), programmable read-only memory (PROM), magnetic memory, a magnetic disk, and an optical disk, but it will be understood by those skilled in the art that an implementation of the database 120 is not limited thereto.

The image processor 140 may be configured to analyze a reference video image to extract a framing rule for at least one reference object in the reference video image. The image processor 140 may be configured to identify a framing type of the reference video image by analyzing the reference video image so as to extract the framing rule. The image processor 140 may be configured to apply various image processing techniques to the reference video image so as to identify the framing type of the reference video image. In an example embodiment, the image processor 140 may be configured to extract a skeleton of a reference object by applying a skeleton extraction algorithm to the reference video image, and identify, based thereon, the framing type of the reference video image. The image processor 140 may be configured to classify, by analyzing the reference video image, the reference video image into one of a CU framing type, an MCU framing type, an MS framing type, an MLS framing type, an FS framing type, and an LS framing type. An image classified into the CU framing type may cover only a face area of the reference object. An image classified into the MCU framing type may cover the face area and a shoulder portion of the reference object. An image classified into the MS framing type may cover an upper body including a waist portion of the reference object. An image classified into the MLS framing type may cover an upper portion of the knee of the reference object. An image classified into the FS framing type may cover a whole body of the reference object. In an image classified into the LS framing type, a reference object may occupy only a portion of the image frame since the reference object is shot from a farther distance than in the case of the FS framing type image.

Figure 2:
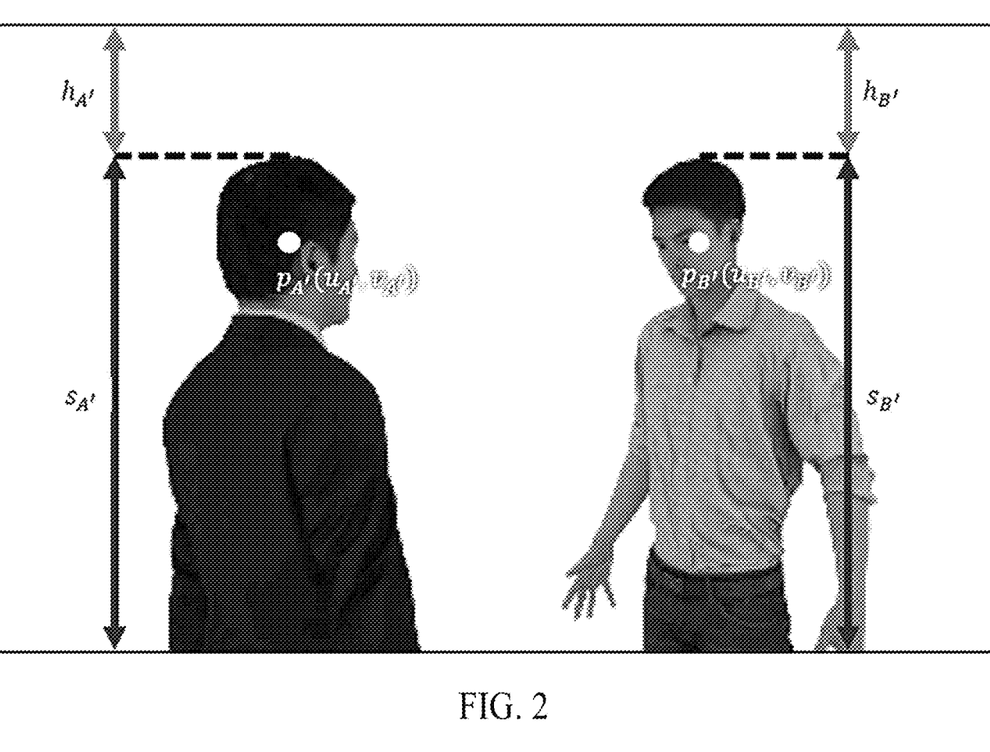
FIG. 2 is a diagram illustrating first on-screen parameters for a reference object extracted from a reference video image.

The image processor 140 may be further configured to calculate first on-screen parameters for the at least one reference object by analyzing the reference video image so as to extract the framing rule. The image processor 140 may be configured to calculate the first on-screen parameters such as coordinates $p_{A'}(u_{A'}, v_{A'})$ of a face central point of the reference object, a height value $s_{A'}$ up to a top of a head of the reference object, and a headroom value $h_{A'}$ for the reference object by applying predetermined image processing techniques to the reference video image, as illustrated in FIG. 2. In FIG. 2, the headroom value $h_{A'}$ for the reference object may denote a length from the top of the head of the reference object to a upper boundary point of the image frame. When there are a plurality of reference objects in the reference video image, the image processor 140 may be configured to calculate the first on-screen parameters such as coordinates $p_{A'}(u_{A'}, v_{A'})$ and $p_{B'}(u_{B'}, v_{B'})$ of face central points of respective reference objects, height values $s_{A'}$ and $s_{B'}$ up to tops of heads of the respective reference objects, and headroom values $h_{A'}$ and $h_{B'}$ for the respective reference objects, as illustrated in FIG. 2.

Figure 3:
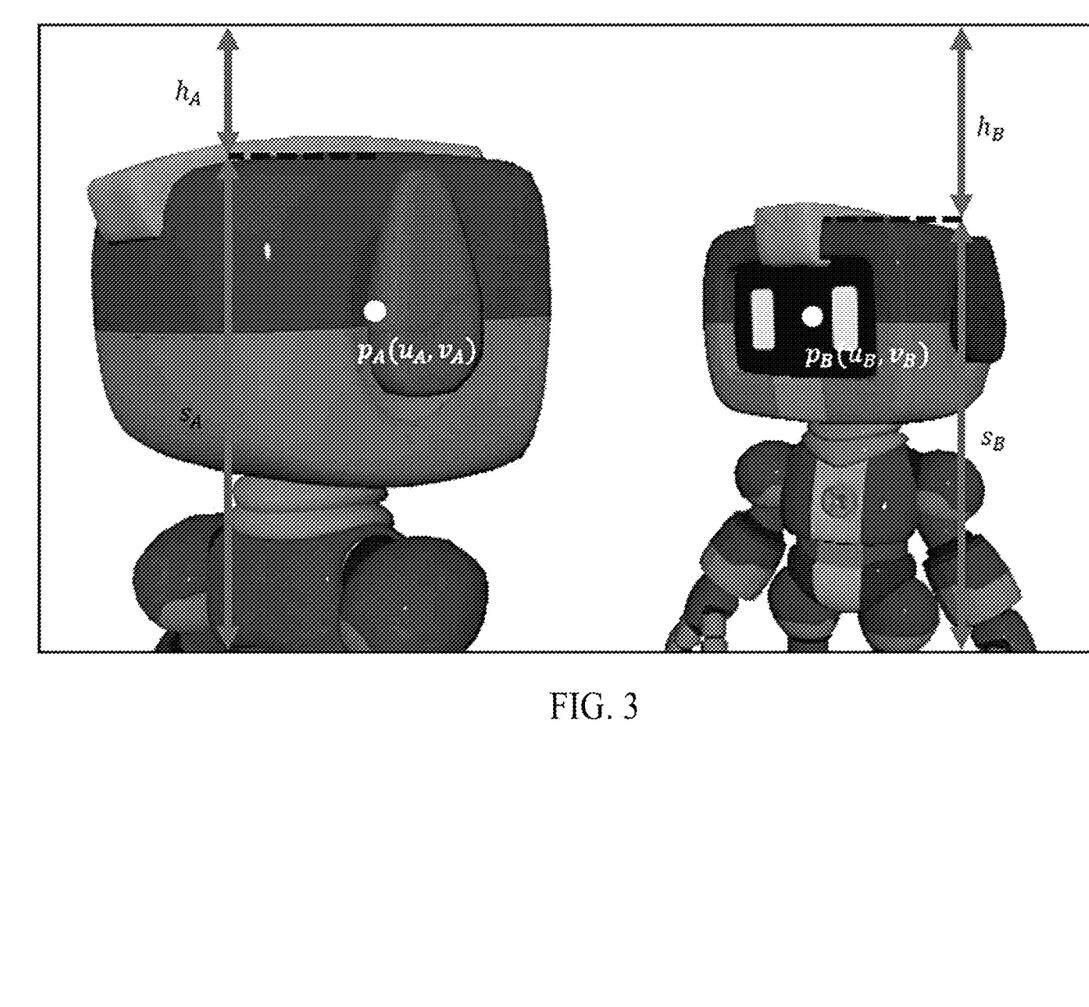
FIG. 3 is a diagram illustrating second on-screen parameters calculated for a 3D target object and applied in framing of a 3D animation image.

The image processor 140 may be further configured to generate a framing rule for at least one 3D target object used for a 3D animation using the framing rule for the at least one reference object in the reference video image. To this end, the image processor 140 may be configured to optimize at least one second on-screen parameter for the at least one 3D target object, based on the first on-screen parameters. Considering that the reference object in the reference video image may have a size different from that of the 3D target object, the image processor 140 may be configured to calculate, based on the first on-screen parameters, at least one second on-screen parameter optimized for the 3D target object. FIG. 3 is a diagram illustrating second on-screen parameters calculated for a 3D target object and applied in framing of a 3D animation image. In an example embodiment in which the number of 3D target objects in a 3D animation image is two, at least one second on-screen parameter may include coordinates $p_A(u_A, v_A)$ and $p_B(u_B, v_B)$ of face central points of the 3D target objects. In this example embodiment, the at least one second on-screen parameter may further include height values $s_A$ and $s_B$ up to tops of heads of the 3D target objects, and headroom values $h_A$ and $h_B$ for the 3D target objects. When it is assumed that there are a first reference object and a second reference object in a reference video image, and there are first and second target objects in a 3D animation image, the image processor 140 may be configured to calculate coordinates $p_A(u_A, v_A)$ of a face central point of the first target object and coordinates $p_B(u_B, v_B)$ of a face central point of the second target object so as to minimize a value expressed by Equation 1 below.

$$\omega_1 E_V + \omega_2 E_H + \omega_3 E_M \quad \text{[Equation 1]}$$

In Equation 1, $\omega_1$ is a weight for $E_V$, $\omega_2$ is a weight for $E_H$, $\omega_3$ is a weight for $E_M$, and a sum of $\omega_1$, $\omega_2$, and $\omega_3$ is 1.

$E_V$ is expressed by Equation 2 below.

$$E_V = |s_A - s_{A'}| + |s_B - s_{B'}| \quad \text{[Equation 2]}$$

In Equation 2, $s_A$ and $s_B$ denote height values up to tops of heads of the first and second target objects, respectively, and $s_{A'}$ and $s_{B'}$ denote height values up to tops of heads of the first and second reference objects, respectively.

$E_H$ is expressed by Equation 3 below.

$$E_H=|\min(h_A,h_{B'})-\min(h_{A'},h_B)|\qquad \text{[Equation 3]}$$

In Equation 3, $h_A$ and $h_B$ denote headroom values for the first and second target objects, respectively, and $h_{A'}$ and $h_{B'}$ denote headroom values for the first and second reference objects, respectively.

$E_M$ may be expressed by Equation 4 below.

$$E_M=|(u_A+u_B)/2-(u_{A'}+u_{B'})/2|\qquad \text{[Equation 4]}$$

In Equation 4, $u_A$ and $u_B$ denote X coordinates of the face central points of the first and second target objects, respectively, and $u_{A'}$ and $u_{B'}$ denote X coordinates of face central points of the first and second reference objects, respectively.

The image processor 140 may be further configured to generate a virtual camera layout using the framing rule for the at least one 3D target object. When coordinates of a face central point of a 3D target object are calculated, the image processor 140 may generate the virtual camera layout using the coordinates together with a framing type of the reference video image. A process in which the image processor 140 generates the virtual camera layout using the coordinates of the face central point of the 3D target object may use one of publicly known methods, and thus a detailed description thereof will be omitted.

Figure 4:
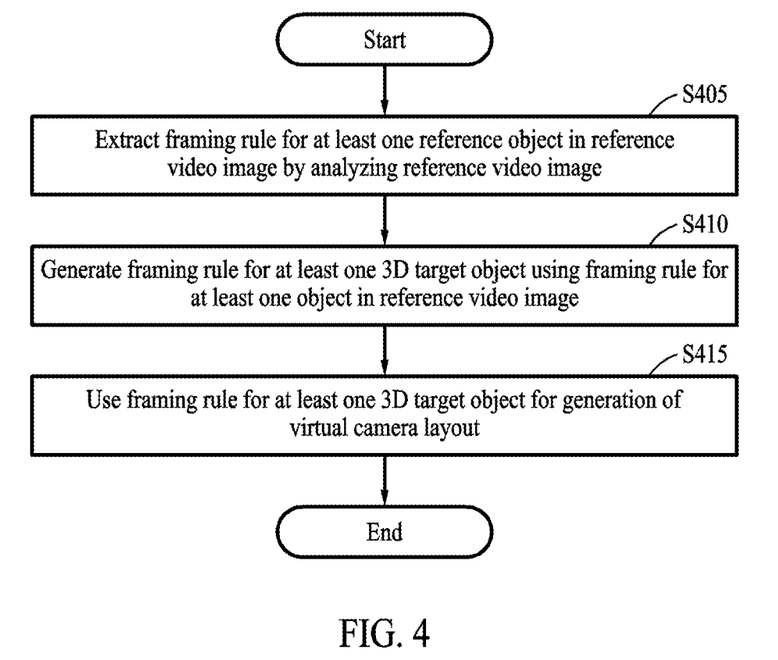
FIG. 4 is a flowchart illustrating a method of framing a 3D target object for generation of a virtual camera layout according to an example embodiment.

FIG. 4 is a flowchart illustrating a method of framing a 3D target object for generation of a virtual camera layout according to an example embodiment.

The method of framing a 3D target object according to an example embodiment begins with operation S405 in which a reference video image is analyzed to extract a framing rule for at least one reference object in the reference video image. In operation S405, a framing type of the reference video image may be identified by analyzing the reference video image. As described above, the reference video image may be classified into one of a CU framing type, an MCU framing type, an MS framing type, an MLS framing type, an FS framing type, and an LS framing type. In addition, in this operation, first on-screen parameters for the at least one reference object may be calculated by analyzing the reference video image. As described above, when a reference object includes first and second reference objects, a predetermined image processing technique may be applied to the reference video image to calculate coordinates of face central points of the first and second reference objects, height values up to tops of heads of the first and second reference objects, and headroom values for the first and second reference objects. In operation S410, a framing rule for at least one 3D target object may be generated using the framing rule for the at least one object in the reference video image. In this operation, at least one second on-screen parameter for the at least one 3D target object may be optimized based on the first on-screen parameters. As described above, when it is assumed that there are the first and second reference objects in the reference video image and there are first and second target objects in a 3D animation image, the coordinates $p_A(u_A, v_A)$ of a face central point of the first target object and coordinates $p_B(u_B, v_B)$ of a face central point of the second target object may be calculated using Equations 1 to 4 above. In operation S415, the framing rule for the at least one 3D target object may be used for generation of a virtual camera layout.

The example embodiments described herein may be implemented using hardware components, software components, or a combination thereof. For example, the apparatus, methods and components described in the example embodiments may include, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions, may be implemented using a general-purpose computer or special purpose computer. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and/or data may be embodied permanently or to temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by a non-transitory computer readable recording medium.

The method according to the above-described example embodiments may be recorded in non-transitory computer-readable media including program instructions to implement various operations which may be performed by a computer. The computer readable medium may include, alone or in combination with the program instructions, data files, data structures, and the like, and the program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of framing a three dimensional (3D) target object for generation of a virtual camera layout, the method comprising:
analyzing a reference video image to extract a framing rule for at least one reference object in the reference video image;
generating a framing rule for at least one 3D target object using the framing rule for the at least one reference object in the reference video image; and
using the framing rule for the at least one 3D target object for generation of a virtual camera layout.

2. The method of claim 1, wherein the analyzing a reference video image to extract a framing rule for at least one reference object in the reference video image comprises:
identifying a framing type of the reference video image by analyzing the reference video image; and
calculating first on-screen parameters for the at least one reference object by analyzing the reference video image.

3. The method of claim 2, wherein the generating a framing rule for at least one 3D target object using the framing rule for the at least one object in the reference video image comprises optimizing at least one second on-screen parameter for the at least one 3D target object, based on the first on-screen parameters.

4. The method of claim 2, wherein the identifying a framing type of the reference video image by analyzing the reference video image comprises classifying the reference video image into one of a close-up (CU) framing type, a medium close-up (MCU) framing type, a medium shot (MS) framing type, a medium long shot (MLS) framing type, a full shot (FS) framing type, and a long shot (LS) framing type.

5. The method of claim 3, wherein the at least one reference object comprises a first reference object and a second reference object, and
wherein the calculating first on-screen parameters for the at least one reference object by analyzing the reference video image comprises calculating coordinates of face central points of the first and second reference objects, height values up to tops of heads of the first and second reference objects, and headroom values for the first and second reference objects by applying a predetermined image processing technique to the reference video image.

6. The method of claim 5, wherein the at least one 3D target object comprises a first target object and a second target object, and
wherein the optimizing at least one second on-screen parameter for the at least one 3D target object based on the first on-screen parameters comprises calculating coordinates $p_A(u_A, v_A)$ of a face central point of the first target object and coordinates $p_B(u_B, v_B)$ of a face central point of the second target object so as to minimize a value expressed by the following equation:

$$\omega_1 E_V + \omega_2 E_H + \omega_3 E_M$$

where $\omega_1$ is a weight for $E_V$, $\omega_2$ is a weight for $E_H$, $\omega_3$ is a weight for $E_M$, and a sum of $\omega_1$, $\omega_2$, and $\omega_3$ is 1,
where $E_V$ is expressed by the following equation:

$$E_V = |s_A - s_{A'}| + |s_B - s_{B'}|$$

where $s_A$ and $s_B$ denote height values up to tops of heads of the first and second target objects, respectively, and $s_{A'}$ and $s_{B'}$ denote height values up to the tops of the heads of the first and second reference objects, respectively,
where $E_H$ is expressed by the following equation:

$$E_H = |\min(h_A, h_B) - \min(h_{A'}, h_{B'})|$$

where $h_A$ and $h_B$ denote headroom values for the first and second target objects, respectively, and $h_{A'}$ and $h_{B'}$ denote the headroom values for the first and second reference objects, respectively, and
where $E_M$ is expressed by the following equation:

$$E_M = |(u_A + u_B)/2 - (u_{A'} + u_{B'})/2|$$

where $u_A$ and $u_B$ denote X coordinates of the face central points of the first and second target objects, respectively, and $u_{A'}$ and $u_{B'}$ denote X coordinates of the face central points of the first and second reference objects, respectively.

7. An apparatus for framing a three dimensional (3D) target object for generation of a virtual camera layout, the apparatus comprising:
a database to store a reference video image; and
an image processor,
wherein the image processor is configured to:
analyze the reference video image to extract a framing rule for at least one reference object in the reference video image;
generate a framing rule for at least one 3D target object using the framing rule for the at least one reference object in the reference video image; and
generate a virtual camera layout using the framing rule for the at least one 3D target object.

8. The apparatus of claim 7, wherein the image processor is further configured to:
identify a framing type of the reference video image by analyzing the reference video image; and
calculate first on-screen parameters for the at least one reference object by analyzing the reference video image.

9. The apparatus of claim 8, wherein the image processor is further configured to optimize at least one second on-screen parameter for the at least one 3D target object, based on the first on-screen parameters.

10. The apparatus of claim 8, wherein the image processor is further configured to classify the reference video image into one of a close-up (CU) framing type, a medium close-up (MCU) framing type, a medium shot (MS) framing type, a medium long shot (MLS) framing type, a full shot (FS) framing type, and a long shot (LS) framing type.

11. The apparatus of claim 9, wherein the at least one reference object comprises a first reference object and a second reference object, and
wherein the image processor is further configured to calculate coordinates of face central points of the first and second reference objects, height values up to tops of heads of the first and second reference objects, and headroom values for the first and second reference objects by applying a predetermined image processing technique to the reference video image.

12. The apparatus of claim 11, wherein the at least one 3D target object comprises a first target object and a second target object,
wherein the image processor is further configured to calculate coordinates $p_A(u_A, v_A)$ of a face central point of the first target object and coordinates $p_B(u_B, v_B)$ of a face central point of the second target object so as to minimize a value expressed by the following equation:

$$\omega_1 E_V + \omega_2 E_H + \omega_3 E_M$$

where $\omega_1$ is a weight for $E_V$, $\omega_2$ is a weight for $E_H$, $\omega_3$ is a weight for $E_M$, and a sum of $\omega_1$, $\omega_2$, and $\omega_3$ is 1, where $E_V$ is expressed by the following equation:

$$E_V = |s_A - s_{A'}| + |s_B - s_{B'}|$$

where $s_A$ and $s_B$ denote height values up to tops of heads of the first and second target objects, respectively, and $s_{A'}$ and $s_{B'}$ denote height values up to the tops of the heads of the first and second reference objects, respectively, where $E_H$ is expressed by the following equation:

$$E_H = |\min(h_{A'}, h_{B'}) - \min(h_A, h_B)|$$

where $h_A$ and $h_B$ denote headroom values for the first and second target objects, respectively, and $h_{A'}$ AND $h_{B'}$ denote the headroom values for the first and second reference objects, respectively, and where $E_M$ is expressed by the following equation:

$$E_M = |(u_A + u_B)/2 - (u_{A'} + u_{B'})/2|$$

where $u_A$ and $u_B$ denote X coordinates of the face central points of the first and second target objects, respectively, and $u_{A'}$ and $u_{B'}$ denote X coordinates of the face central points of the first and second reference objects, respectively.

13. A non-transitory computer-readable medium storing computer-readable instructions that, when executed by a processor, cause the processor to perform the method of claim 1.

* * * * *